April 18, 1933.  J. H. VICTOR  1,904,651
GASKET
Original Filed June 30, 1930
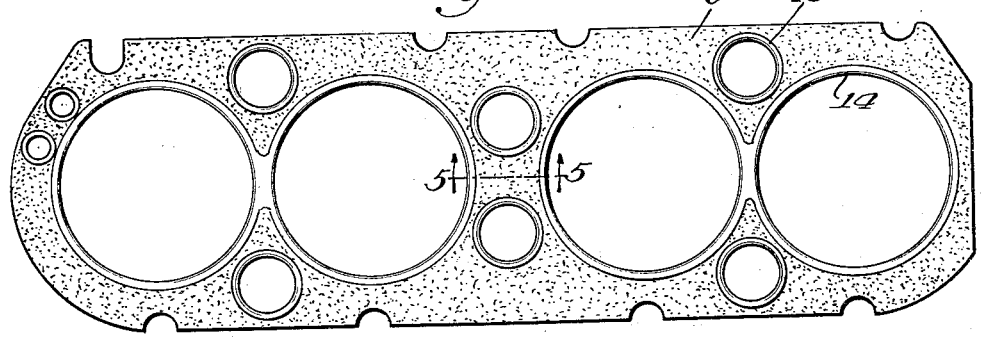
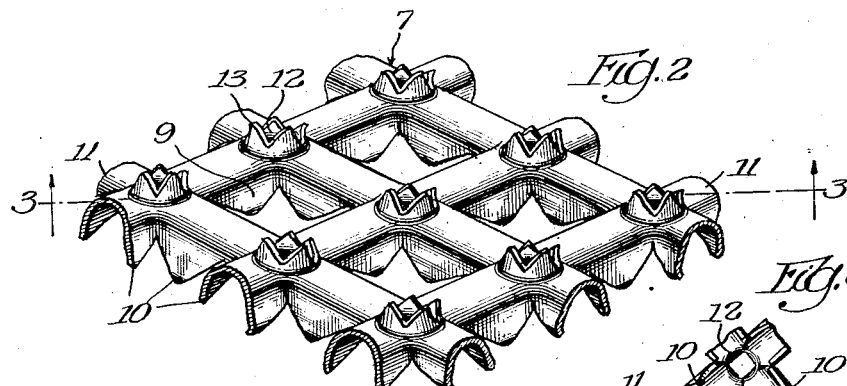
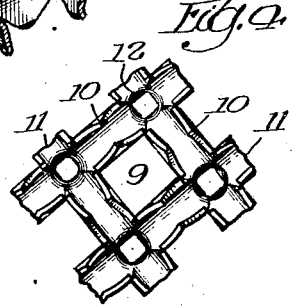
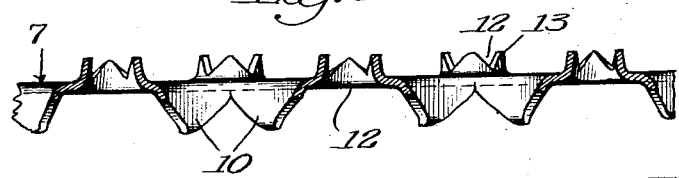
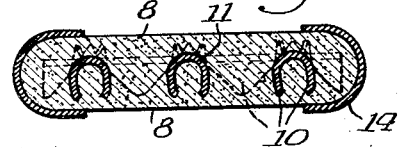
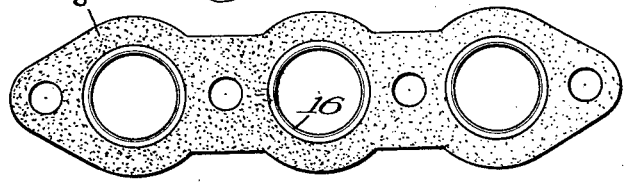
Inventor
John H. Victor
By Wm. O. Bell, Atty.

Patented Apr. 18, 1933

1,904,651

UNITED STATES PATENT OFFICE

JOHN H. VICTOR, OF EVANSTON, ILLINOIS, ASSIGNOR TO VICTOR MANUFACTURING & GASKET COMPANY, OF CHICAGO, ILLINOIS, A CORPORATION OF ILLINOIS

GASKET

Application filed June 30, 1930, Serial No. 464,813. Renewed February 27, 1933.

This invention relates to gaskets and it is particularly useful in gaskets of comparatively large size like the cylinder head and manifold gaskets for internal combustion engines.

The object of the invention is to provide a novel gasket of simple construction which has sufficient stability for maintaining it in proper condition for use during shipping and handling, which will effectively seal the joint to which it is applied, and which can be economically manufactured.

Another object of the invention is to provide a gasket having a reenforcing core interposed between and embedded in a novel manner in layers of compressible heat resisting material and forming a unitary flexible light and inexpensive gasket.

And a further object of the invention is to provide a metal core having many substantially square perforations punched therein and providing projections at the ends of the perforations and on opposite faces of the core, with layers of compressible refractory material pressed upon the faces of the core and embedded and interlocked in the perforations and anchored with the projections to form a unitary flexible structure with the refractory material securely engaged and interlocked with the core.

With these and other ends in view I have illustrated the invention in a selected embodiment in the accompanying drawing and referring thereto, Fig. 1 is a plan view of a cylinder head gasket.

Fig. 2 is a greatly enlarged fragmentary perspective view, partly in section, of the core.

Fig. 3 is a sectional view on the line 3—3 of Fig. 2.

Fig. 4 is a fragmentary plan view of the bottom of the core as it appears in Fig. 2.

Fig. 5 is an enlarged transverse sectional view on the line 5—5 of Fig. 1.

Fig. 6 is a plan view of an exhaust manifold gasket embodying the invention.

Referring to the drawing 7 is the core and 8 is the refractory gasket material. The core is preferably made of thin sheet metal punched from one side to provide a plurality of perforations 9, the metal displaced forming prongs or projections 10 on the other side of the core. In the construction shown in the drawing the perforations are substantially square and they are arranged symmetrically in rows extending longitudinally and transversely of the core, for convenience in manufacture, and the metal punched in forming the perforations provides four prongs or projections one at each side of each perforation and tapering to a point which extends in a direction substantially normal to the general plane of the core. Sometimes these points will be straight, sometimes they will hook inward, and sometimes they will hook outward, but I prefer that they should hook outward slightly as indicated in the drawing to avoid any tendency of the prongs to bend and close the perforations when the heat resisting gasket material is pressed thereon. Punching the perforations 9 in rows in forming the core produces crossed bars 11 which are slightly curved in cross section to form crowns on one side, Fig. 2, and channels on the other side, Fig. 4. At the intersection of these bars, on the crowned side, the metal is punched up to form perforations 12 surrounded by prongs or projections 13. These perforations 12 are smaller than the perforations 9 and the prongs 13 are smaller than the prongs 10. I find it convenient to punch four prongs 13 and generally they will project straight out from the body of the core. Thus the core comprises a skeleton metal sheet of any size or shape desired and having a plurality of perforations and channel bars with projections on one side about some of the perforations and projections on the other side about the other perforations and forming an integral core barbed on both sides, with perforations to receive the heat resisting material and interlock the core with said material on both sides of the core, and with projections to anchor the material to the core. The heat resisting material is preferably made of asbestos or asbestos composition, or its equivalent, having compressible and heat resisting qualities adapting it for the purpose. I prefer to apply the asbestos material in the form of millboard which may be suitably softened, or it may be applied as a layer; in either case sufficient pressure should be applied to both sides to press the material into the openings and channels of the core and into anchoring engagement with the prongs. Care should be observed to make the gasket of uniform thickness throughout and preferably the prongs are embedded in the heat resisting material below the surfaces thereof so that they will not interfere with the compressibility of the gasket in adapting itself to the joint to which it is applied. The core may be made of light gage metal and the perforations 9 may be punched close together therein producing a skeleton structure. This enables the heat resisting material on both sides of the core to be securely united with the core to form a single unitary structure which will not loosen or separate into its parts under any ordinary conditions. It is preferred to apply a coating of graphite on the outer faces of the heat resisting material to prevent it from sticking to the joint. It is not necessary that the prongs should be asymmetrically shaped or arranged as illustrated in the drawing because in manufacture it will often happen that the prongs will be irregularly shaped and arranged and their edges will be more or less ragged but this does not detract from their usefulness in this invention. I may embody the invention in gaskets of any size, shape or construction and for any use. I have shown it in Fig. 1 in a cylinder head gasket and provided with flanges 14 about the cylinder openings and with flanges 15 about the water circulation openings, and I have shown it in Fig. 6 in an exhaust manifold gasket having flanges 16 about the openings. These flanges may be single for each opening or they may be united for two or more openings, or united for all the openings in accordance with Patent 1,472,133, patented October 30, 1923. The flanges serve the primary purpose of protecting the edges of the openings and in forming and maintaining a tight seal for the joint and in reenforcing the gasket. The flanges overlap the marginal edges of the gasket and form a desirable protection therefor and assist in retaining the heat resisting material in place. In a gasket of this construction the flanges are particularly important at narrow sections between service openings because of the reenforcement and protection against leaking and blowing which they provide. The core forms the base supporting the heat resisting material which has some stability when applied as a preformed sheet but very little when applied as a composition layer. A substantial quantity of the heat resisting material enters the large perforations 9 and a less amount enters the smaller perforations 12 but the effect is to interlock the heat resisting material with the core, and the prongs anchor the material and preserve this interlock. With the core as a reenforcement the gasket has sufficient stability for shipping and handling with reasonable care, it is sufficiently flexible to enable it to be applied to a joint easily and conveniently, it has sufficient compressibility to enable it to yield under pressure in tightening a joint to form a good seal, and it can be produced at comparatively low cost.

I have shown the invention in a form which I consider suitable for the purpose but it may be necessary or desirable to vary the construction of parts more or less to adapt it for different gaskets or otherwise and I reserve the right to make all such changes as fairly fall within the scope of the following claims.

I claim:

1. A gasket comprising a metal core having perforations punched therein and crossed channel bars smaller than the perforations and separating said perforations and other perforations punched in the intersections of said bars, the metal punched in forming the first-mentioned perforations forming prongs on one side of the core and extensions of the sides of said channel bars, and the metal punched in forming the perforations in the intersections of the bars forming prongs on the other side of said core, and gasket material applied to the sides of the core and filling said perforations and embedding said prongs.

2. A gasket having service openings and comprising a metal core having perforations therein with crossed bars separating said perforations and other perforations in the intersections of said bars, said bars being crowned on one side and channeled on the other side, prongs on one side of the core about one set of perforations and prongs on the other side of the core about the other set of perforations, gasket material applied to the sides of the core and filling said perforations and embedding said prongs, and flanges binding the edges of said openings and overlapping the marginal edges of the gasket material about the openings.

3. As a new article of manufacture, a gasket core having perforations punched therein and crossed bars narrower than the perforations and separating said perforations and other perforations punched in the intersections of said bars, the metal displaced in forming the first-mentioned perforations forming prongs on one side of the sheet and the metal displaced in forming the perforations at the intersections of the bars forming prongs on the other side of the sheet.

4. As a new article of manufacture, a gasket core having perforations punched therein with crossed bars separating said perforations and other perforations in the intersections of said bars, said bars being crowned on one side and channeled on the other side, prongs on one side of the core about one set of perforations and prongs on the other side of the core about the other set of perforations.

5. As a new article of manufacture, a gasket core having perforations punched therein and crossed bars separating the perforations, prongs about the edges of said perforations disposed on one side of the core and forming sides on the crossed bars whereby the portions of said bars intermediate the intersections thereof are substantially channel-shaped, said bars, having perforations therein at the intersections thereof and prongs extending upwardly about said perforations on the other side of the core, the perforations at the intersections of said crossed bars being smaller than the perforations separated by the crossed bars.

JOHN H. VICTOR.